US009321901B2

(12) United States Patent
Frenkel et al.

(10) Patent No.: US 9,321,901 B2
(45) Date of Patent: Apr. 26, 2016

(54) PLASTICIZERS DERIVED FROM RENEWABLE FEEDSTOCK

(71) Applicant: Galata Chemicals LLC, Southbury, CT (US)

(72) Inventors: Peter Frenkel, Danbury, CT (US); Steven McKeown, Southbury, CT (US)

(73) Assignee: GALATA CHEMICALS LLC, Southbury, CT (US)

( * ) Notice: Subject to any disclaimer, the term of this patent is extended or adjusted under 35 U.S.C. 154(b) by 0 days.

(21) Appl. No.: 14/350,559

(22) PCT Filed: Oct. 11, 2012

(86) PCT No.: PCT/US2012/059814
§ 371 (c)(1),
(2) Date: Apr. 8, 2014

(87) PCT Pub. No.: WO2013/055961
PCT Pub. Date: Apr. 18, 2013

(65) Prior Publication Data
US 2014/0309345 A1    Oct. 16, 2014

Related U.S. Application Data

(60) Provisional application No. 61/547,427, filed on Oct. 14, 2011, provisional application No. 61/590,204, filed on Jan. 24, 2012.

(51) Int. Cl.
*C08K 5/15* (2006.01)
*C09K 3/00* (2006.01)
*C08K 5/1515* (2006.01)
*C08K 5/00* (2006.01)

(52) U.S. Cl.
CPC ............. *C08K 5/1515* (2013.01); *C08K 5/0016* (2013.01)

(58) Field of Classification Search
CPC .................................................. C08K 5/1515
USPC ....................................................... 524/109
See application file for complete search history.

(56) References Cited

U.S. PATENT DOCUMENTS

| | | | |
|---|---|---|---|
| 3,493,414 A | 2/1970 | Hastings et al. | |
| 3,917,550 A | 11/1975 | Clas et al. | |
| 4,113,689 A | 9/1978 | Modena et al. | |
| 4,670,494 A | 6/1987 | Semenza et al. | |
| 4,785,037 A | 11/1988 | Ikeda et al. | |
| 5,304,589 A * | 4/1994 | Davidson | C08L 23/0815 524/178 |
| 6,013,703 A * | 1/2000 | Kuhn | C08K 5/07 524/100 |
| 7,229,697 B2 | 6/2007 | Kliesch et al. | |
| 8,557,139 B2 * | 10/2013 | Eaton | 252/182.28 |
| 8,703,849 B2 * | 4/2014 | Hagberg et al. | 524/114 |
| 2002/0013396 A1 | 1/2002 | Benecke et al. | |
| 2005/0137299 A1 * | 6/2005 | Berndt | 524/114 |
| 2008/0200595 A1 | 8/2008 | Hinault et al. | |
| 2009/0105365 A1 | 4/2009 | Konishi et al. | |
| 2011/0272174 A1 * | 11/2011 | Chaudhary | 174/110 SR |

FOREIGN PATENT DOCUMENTS

| | | |
|---|---|---|
| GB | 934689 | 8/1963 |
| GB | 1279939 | 6/1972 |
| WO | 0198404 | 12/2001 |
| WO | 2006121183 | 11/2006 |
| WO | 2009102877 | 8/2009 |
| WO | 2011041396 | 4/2011 |
| WO | 2011090812 | 7/2011 |
| WO | 2012019073 | 2/2012 |
| WO | 2012061606 | 5/2012 |
| WO | 2013003225 | 1/2013 |
| WO | 2013048752 | 4/2013 |
| WO | 2013048771 | 4/2013 |
| WO | 2013119402 | 8/2013 |

OTHER PUBLICATIONS

Rahman et al., "The plasticizer market: an assessment of traditional plasticizers and research trends to meet new challenges", Prog. Polym. Sci. 29 (2004) 1223-1248.
Haryono et al., "Plasticizer from Vegetable Oil Derivatives: A Review" Materials Science, Prosiding Simposium Nasional Polimer V, 2005, 240-248.
Morgenstern, "Epoxidized fatty acid esters as plasticizers for PVC" 2013.
Greenspan et al., "Epoxy Fatty Acid Ester Plasticizers", Indust. Egn. Chem., vol., 45, No. 12, 2722-2726.
Merzlikina et al., "Epoxified esters of fatty acids of tall oil—plastifier-stabilizers of polyvinyl chloride", Raw and Auxiliary Materials, 1-9.
Gan et al., "Epoxidized Esters of Palm Olein as Plasticizers for Poly(vinyl Chloride)"; Eur. Polym. J. vol. 31, No. 8 (1995) pp. 719-724.
Abstract, XP002741459, Database WPI Week 200123, Thomson Scientific, London, GB, AN 2001-220479, & JP 2000 319468, Asahi Denka Kogyo KK, (Nov. 21, 2000).
Search Report mailed by the Intellectual Property Office of Singapore in SG 11201401469R on Jun. 4, 2015.
EESR mailed by EPO in EP 12840721.0 on Jul. 22, 2015.
ISR and Written Opinion mailed in PCT/US12/59814 on Feb. 26, 2013.

* cited by examiner

*Primary Examiner* — Hui Chin
(74) *Attorney, Agent, or Firm* — Dilworth IP, LLC

(57) ABSTRACT

Plasticizer compositions comprising epoxidized fatty acid mono-esters and epoxy-esters are provided. The plasticizer compositions are free of compatibilizer and may contain metal perchlorates and/or phenolic antioxidants and/or conventional plasticizers. The compositions are useful for reduced extraction and lower volatility of halogenated polymers containing the compositions. The plasticizer compositions give reduced extraction of at least 15%. A process for making the plasticizer compositions is also provided. A method of reduced plasticizer extraction from halogenated polymers, such as polyvinyl chloride, is further provided. The plasticizer compositions may be added to PVC resins in effective amounts ranging from 1 and 200 phr.

16 Claims, No Drawings

US 9,321,901 B2

PLASTICIZERS DERIVED FROM RENEWABLE FEEDSTOCK

FIELD OF THE INVENTION

The present invention relates to plasticizer compositions prepared from renewable feedstock that are suitable for plasticizing halogen-containing polymers, such as polyvinyl chloride (PVC) and PVC-based co-polymers, terpolymers, and grafted polymers.

BACKGROUND OF THE INVENTION

Plasticizers are commonly incorporated into polyvinyl chloride (PVC) in order to transform rigid PVC resin into flexible PVC articles. Esters of phthalic acid (phthalates) are used as primary plasticizers at about 10-60 parts per 100 parts (phr) of PVC. Epoxidized vegetable oils, such as epoxidized soybean oil (ESBO) and epoxidized linseed oil (ELSO), are used as secondary plasticizers. Further examples of secondary plasticizers are epoxidized fatty acid mono-esters, such as epoxidized methyl soyate and epoxidized 2-ethylhexyl tallate. Additionally, epoxidized octyl tallate and butyl epoxystearate are used commercially as secondary plasticizers for PVC [a) PVC Handbook by Charles, Wilkes, Charles Daniels, James Summers, Hanser Gardner Publishers; 2005, p.180; and b) Theory and Practice of Vinyl Compounding by Vic Struber; Argus Chemical Corporation; 1968; Library of Congress Catalogue No. 68-19157. pg. 4]. Struber refers to epoxidized 2-ethylhexyl tallate, which is commercially available from Galata Chemicals LLC as Drapex® 4.4. Struber also describes epoxidized octyl oleate, which Galata Chemicals LLC offers as Drapex 3.2. ESBO and ELSO have limited compatibility with PVC due to their high molecular weight, while epoxidized mono-esters are known for their unacceptably high extraction out of the PVC matrix.

Several patents and patent applications relate to bio-based plasticizers derived from fatty acids containing epoxy functional groups, as referred to hereinbelow.

U.S. Pat. No. 2,895,966 describes plasticizer stabilizers for synthetic resins and plastic compositions comprising said plasticizer stabilizers.

U.S. Pat. No. 3,049,504 relates to plasticizer stabilizers for synthetic resins.

U.S. Patent Application No. 2002/0013396 discloses compositions and methods for plasticizing polyvinyl chloride polymers where the plasticizers contain fatty acids derived from vegetable oils and the fatty acids are substantially fully esterified with an alcohol (mono-ol or polyol), the fatty acids having unsaturated bonds that are substantially fully epoxidized, and wherein the fatty acids are added substantially randomly to one or more hydroxyl sites on the alcohol. The plasticizers may be added in amounts between about 10 to 230 phr of PVC resin.

WO2009/102592 describes unhindered polyols used to react with an epoxidized soyate to make epoxidized soyate diester in the presence of a catalyst. The unhindered polyol can be 1,3-propanediol or any polyol having four or more carbon atoms with no two adjacent carbon atoms having hydroxyl functionality. A combination of catalysts is used to promote the trancesterification reaction of the epoxidized soyate with the unhindered polyol to yield a high percentage of epoxidized sovate diester with epoxy functionality retained. The primary catalyst is a metallic hydroxide, and the secondary catalyst is a titanate. Bioderived epoxidized soyate diester plasticizers useful for thermoplastics and thermosets result.

U.S. Patent Application No. 2010/0010126 describes the use of the interesterification reaction between vegetal or animal oils as monoacid esters (preferentially with 1 to 12 carbons) and monoalcohol esters (preferentially with 1 to 12 carbons). The use of ethyl acetate is preferred as it is a product that may be obtained from ethanol (renewable) and has a boiling point (77 deg. C.), which facilitates separation by vacuum distillation at the end of the reaction and its reuse. By varying the molar ratio between glycerol Wester (oil or fat) and monoalcohol ester, different proportions of glycerol esters are obtained with 1 or 2 linked fatty acids and 1 or 2 linked acids of short chain, along with the formation of fatty acid ester and monoalcohol ester. After the distillation of excess residual ethyl acetate, products are obtained with viscosity from 21 to 33 cPs at 25 deg. C., in the case of the reaction with soy oil.

U.S. Patent Application Publication No. 2010/0010127 relates to bioplasticizers or primary oleochemical plasticizers and the improved process for obtaining thereof. It refers primarily to epoxidized oleochemical plasticizers produced from vegetable oils, as substitute for traditional petrochemical plasticizers.

U.S. Pat. No. 7,071,343 describes epoxidized glyceride acetates made by a process which comprises reacting an epoxy fatty acid ester and triacetin.

WO2011/143028 relates to PVC resin-based compositions that include biochemical plasticizers as the primary plasticizers. The compositions include PVC resin, a compatibilizer, one or more biochemical plasticizers and, optionally, a thermoplastic elastomer impact modifier. The biochemical plasticizers are present in substantial quantities in the compositions and, in some embodiments, are the only plasticizers present in the compositions.

Notwithstanding the above literature, there is a continuing need for improved bio-based plasticizers having reduced extraction properties and lower volatility for halogen-containing polymers, such as polyvinyl chloride (PVC) and its co-polymers.

SUMMARY OF THE INVENTION

In one aspect, the invention is directed to plasticizer compositions for reduced plasticizer extraction from plasticized halogenated polymers comprising (i) an epoxidized fatty acid mono-ester and (ii) an epoxy-ester. In certain embodiments, the plasticizer compositions of the invention are substantially free of compatibilizers. In some embodiments still, the plasticizer compositions of the invention further comprise a metal perchlorate and/or antioxidant.

In a second aspect, the invention is directed to a process for preparing plasticizer compositions for reduced plasticizer extraction from plasticized halogenated polymers comprising the steps of: providing an epoxidized fatty acid mono-ester; and blending said epoxidized fatty acid mono-ester with an epoxy-ester for a predetermined amount of time at ambient temperature to attain a homogeneous liquid blend.

In a third aspect, the invention provides a process for making a plasticized halogenated polymer composition comprising the steps of (i) providing an epoxidized fatty acid mono-ester, (ii) blending said epoxidized fatty acid mono-ester with an epoxy-ester for a predetermined amount of time at ambient temperature to attain a homogeneous liquid blend, and (iii) adding said homogeneous liquid blend to a halogenated polymer.

In a fourth aspect, the invention is directed to a plasticized polyvinyl chloride composition for reduced plasticizer extraction prepared by a process comprising the steps of (i)

providing an epoxidized fatty acid mono-ester, (ii) blending said epoxidized fatty acid mono-ester with an epoxy-ester for a predetermined amount of time at ambient temperature to attain a homogeneous liquid blend, and (iii) adding said homogeneous liquid blend to polyvinyl chloride in an amount of from 1 to 200 parts per 100 parts of polyvinyl chloride, at a temperature in the range of from 10-300° C.

In a fifth aspect, the invention provides a plasticizer composition comprising (i) an epoxidized fatty acid mono-ester and (ii) an epoxy-ester, wherein the epoxidized fatty acid mono-ester comprises fatty acid derived from tall oil or soybean oil; and wherein the fatty acid derived from tall oil or soybean oil is substantially fully esterified with monohydric alcohol having at least three carbon atoms.

In a sixth aspect, the invention is directed to a plasticizer composition comprising at least one epoxidized fatty acid mono-ester and at least one conventional co-plasticizer ester.

In a seventh aspect, the invention is directed to a plasticizer composition comprising: an epoxidized fatty acid mono-ester, an epoxy-ester, and a metal perchlorate and/or antioxidant.

DETAILED DESCRIPTION OF THE INVENTION

The present invention relates to plasticizer compositions which may be suitable for reduced extraction from plasticized halogenated polymers. In some embodiments, the plasticizer compositions of the invention comprise epoxidized fatty acid mono-esters and epoxy-esters. In one embodiment, the plasticizer compositions comprise a blend containing the epoxidized fatty acid mono-esters and epoxy-esters. In one embodiment still, the epoxidized fatty acid mono-esters and epoxy-esters are substantially free of mono- and/or diglycerides.

In some embodiments, the epoxidized fatty acid mono-esters comprise fatty acids derived from natural oils and animal fats. Exemplary natural oils are vegetable oils and plant oils, which may also contain triglyceride esters of fatty acids. Suitable natural oils are soybean oil, palm oil, olive oil, tall oil, castor oil, cotton seed oil, linseed oil, safflower oil, sunflower oil, canola oil, rapeseed oil, jatropha oil, algae oil, corn oil, tung oil, and mixtures of any two or more thereof. Preferred natural oils include soybean oil, linseed oil, and tall oil.

Suitable animal fats include beef/mutton, pork, dairy, poultry fat, to name a few. Of these, suet, dripping, tallow, lard, bacon, fatback, butter, poultry fat, schmal, blubber, and the like, are preferred.

In one embodiment, the fatty acids derived from natural oils and animal fats are substantially fully esterified with monohydric alcohols. Exemplary monohydric alcohols suitable for the substantially full esterification include methanol, ethanol, n-propanol, isopropanol, butanol, pentanol, hexanol, cyclohexanol, octanol, n-octanol, iso-octanol, 2-ethylhexanol, nonanol. neodecanol, decanol, undecanol, dodecanol, tetradecanol, cetyl alcohol, stearyl alcohol, docosanol, epoxidized prop-2-en-1-ol, and the like, and mixtures of at least thereof.

In some embodiments still, the mono-hydric alcohols have at least three carbon atoms. Preferred are at least six, eight, ten, twelve, and eighteen carbon atoms. Of these at least eight carbon atoms are more preferred.

In further embodiments, the fatty acids included in the epoxidized fatty acid mono-esters of the invention contain unsaturation. Suitable examples of fatty acids containing unsaturation include oleic acid, linoleic acid, linolenic acid, ricinoleic acid, dehydrated ricinoleic acid, and the like, and mixtures of any two or more thereof.

In other embodiments, the fatty acids containing unsaturation are substantially fully epoxidized to provide the epoxidized fatty acid mono-esters of the invention. Suitable examples of epoxidized fatty acid mono-esters include epoxidized 2-ethyhexyl tallate, epoxidized 2-ethylhexyl soyate, epoxidized octyl tallate, epoxidized octyl soyate, epoxidized octyl oleate, epoxidized methyl soyate and mixtures of any two or more thereof. A preferred example is epoxidized 2-ethyhexyl tallate or epoxidized 2-ethylhexyl-soyate.

Examples of suitable epoxy-esters are epoxidized vegetable oil and epoxidized natural oil. Preferred epoxidized vegetable oils are epoxidized soybean oil, epoxidized linseed oil, and mixtures of any two or more thereof. More preferred is epoxidized soybean oil.

Suitable examples of epoxy-esters also include epoxidized propylene glycol dioleate, epoxidized ethylene glycol dioleate, epoxidized propylene glycol disoyate, and mixtures of any two or more thereof.

In further embodiments, the epoxy-esters are substantially fully esterified with polyhydric alcohols. Representative polyhydric alcohols include glycols, glycerols, glycerol mono-acetate, pentaerythritol, and the like, and mixtures of at least two thereof. Preferred substantially fully esterified glycols are substantially free of mono-and/or diglycerides.

In some such embodiments, the plasticizer compositions of the invention may be substantially free of compatibilizers. Exemplary compatibilizers include, but are not limited to, chlorinated polyolefins, ethylene vinylacetate copolymers, ethylene methyl acrylate copolymers, ethylene butyl acrylate copolymers, ethylene/acetate/carbon monoxide terpolymers, ethylene/acrylate/carbon monoxide terpolymers, polyvinylidene fluoride, nitrile butadiene rubber, epoxidized polybutadiene, epoxidized natural rubber, poly(tetramethylene oxide), glutarimide copolymers, thermoplastic polyurethane, and chlorinated polyurethane. Examples of chlorinated polyolefins are, for example, a) a chlorinated polyethylene homopolymer, b) a chlorinated copolymer that contains copolymerized units of i) ethylene and ii) a copolymerizable monomer, or c) a combination thereof. Representative chlorinated olefin polymers also include a) chlorinated homopolymers of ethylene and b) chlorinated copolymers of ethylene and at least one ethylenically unsaturated monomer selected from the group consisting of $C_3$—$C_{10}$ alpha mono-olefins; $C_1$—$C_{12}$ alkyl esters of $C_3$—$C_{20}$ monocarboxylic acids; unsaturated $C_3$—$C_{20}$ mono- or dicarboxylic acids; anhydrides of unsaturated $C_4$—$C_3$ dicarboxylic acids; and vinyl esters of saturated $C_2$—$C_{18}$ carboxylic acids. Chlorinated graft copolymers are included as well. Specific examples of polymers include, for example, chlorinated polyethylene (CPE); chlorinated ethylene vinyl acetate copolymers; chlorinated ethylene acrylic acid copolymers; chlorinated ethylene methacrylic acid copolymers; chlorinated ethylene methyl acrylate copolymers; chlorinated ethylene methyl methacrylate copolymers; chlorinated ethylene n-butyl methacrylate copolymers; chlorinated ethylene glycidyl methacrylate copolymers; chlorinated graft copolymers of ethylene and maleic acid anhydride; and chlorinated copolymers of ethylene with propylene, butene, 3-methyl-1-pentene, or octene. Copolymers may be dipolymers, terpolymers, or higher order copolymers.

In other embodiments, the plasticizer compositions of the invention may further comprise metal perchlorates. According to the invention, the metal perchlorates can be used as powders, solids, and the like; dissolved in the plasticizer compositions of the invention; or introduced in solution. Suitable solvents to provide the solutions include alcohols, glycols, glycerols, esters, phosphites, water, and the like. A preferred solvent is 2-(2-butoxyethoxy)ethanol.

Representative examples of metal perchlorates include alkali metal, alkaline earth metal, aluminum, zinc, lanthanum or cerium metal perchlorates. Preferred are alkali metal perchlorates; for example, lithium, sodium and potassium perchlorate. Of particular preference is sodium perchlorate.

In some embodiments, the metal perchlorates are provided as metal perchlorate hydrates, preferably in powder form. Exemplary hydrates are monohydrates, dihydrates, trihydrates and tetrahydrates.

Perchlorate solutions are commercially available. For example, Galata Chemicals LLC manufactures Mark CE-350, a 2-(2-butoxyethoxy)ethanol solution of sodium perchlorate Preferred are 30 and 60 percent (by. wt.) aqueous sodium perchlorate solutions.

Examples of the amounts of the metal perchlorates used are from about 0.01 to about 10 parts by weight, advantageously from about 0.1 to about 5 parts by weight and in particular from about 0.1 to about 3 parts by weight, based on 100 parts by weight of PVC. Of particular interest is a range from about 0.1 to about 1 parts, based on 100 parts by weight of PVC.

In further embodiments, the plasticizer compositions of the invention may comprise blends comprising epoxidized fatty acid mono-esters and epoxy-esters. Suitable examples include blends comprising epoxidized 2-ethylhexyl tallate or epoxidized 2-ethylhexyl soyate and epoxidized soybean oil, although the skilled person can readily conceive of further exemplary combinations of epoxidized fatty acid mono-esters and epoxy-esters. In certain embodiments still, the blends may be stable, homogeneous, liquid blends.

Any of the known blending processes, methods and techniques, for example, admixing and mixing, can be used to prepare the liquid blends for the purpose of attaining homogeneity and/or stability. In some embodiments, the epoxidized fatty acid mono-esters and epoxy-esters are combined in an admixture, blend, and the like, and kept—with or without agitation—for a predetermined amount of time at ambient temperature. In one embodiment, the predetermined amount of time is in the range of from 1 to 24 hours. Preferred are from 1 to 10 hours, more preferred from two to four hours. Also preferred are times of 1, 2, 3, 4, 5, 6, 7, 8, 9, 10, 12, 14, 18, 22 hours.

In one embodiment still, the epoxidized fatty acid mono-esters and epoxy-esters are combined at a temperature in the range of from 0-300° C. Preferred is a temperature range of from 0-250° C., 10-300° C., 10-200° C., 10-100° C., more preferred is from 20-80° C., 30-60° C.

In one embodiment, the ratio of epoxy-esters to epoxidized fatty acid mono-esters is in the range of from about 5 to about 95 weight percent, based on total weight of epoxy-esters and epoxidized fatty acid mono-esters. Preferred is a ratio in the range of from 10 to 50 weight percent, based on total weight of epoxy-esters and epoxidized fatty acid mono-esters. The ratio of epoxy-esters to epoxidized fatty acid mono-esters may also be in the range of from about 10 to 90, 20 to 30, 30 to 70 and 40 to 60 weight percent, based on total weight of the blend.

In other embodiments still, the plasticizer compositions of the invention may be incorporated into halogenated polymers. Plasticized halogenated polymer compositions may result from such incorporation.

In one such embodiment, the plasticizer compositions of the invention may be incorporated into halogenated polymers, such as PVC, alone or in combination with conventional plasticizers. Conventional plasticizers are known in the art.

Exemplary conventional plasticizers are phthalates, hydrogenated phthalates, aliphatic esters of dicarboxylic acids, polymeric esters of dicarboxylic acids, citrates, sucrose esters, levulinic ketal esters, phosphates, alkyl phenol sulfonates, pyrrolidones, and the like, and mixtures of two or more thereof. Preferable are phthalates, substantially fully esterified mono-, di- and tribasic acids, adipates, azelates, succinates, glutarates, glycol esters, sucrose esters, levulinic ketal esters, citrates, phosphates, alkyl phenol sulfonates and mixtures of at least two thereof. An overview of conventional plasticizers is found at PLASTICS ADDITIVES HANDBOOK, 4$^{th}$ edition, ed. Gächter/Müller, Hansa Gardner Publishers, Munich, 1993, pg. 327-422, which is incorporated by reference herein in its entirety.

Suitable examples of conventional plasticizers, used in accordance with the invention in combination with the inventive plasticizer compositions, also include those from the following groups and mixtures thereof:

A. Phthalate Plasticizers. Exemplary materials preferably include di-2-ethylhexyl, diisononyl and diisodecyl phthalate, also known by the common abbreviations DOP (dioctyl phthalate, di-2-ethylhexyl phthalate), DINP (diisononyl phthalate), and DIDP (diisodecyl phthalate).

B. Aliphatic Ester Plasticizers. Examples include esters of aliphatic dicarboxylic acids, in particular esters of adipic, azelaic or sebacic acid; preferably di-2-ethylhexyl adipate and diisooctyl adipate and esters of trimellitic acid, such as tri-2-ethylhexyl trimellitate, triisodecyl trimellitate (mixture), triisotridecyl trimellitate, triisooctyl trimellitate (mixture), and also tri-$C_6$—$C_8$-alkyl, tri-$C_6$—$C_{10}$-alkyl, tri-$C_7$—$C_9$alkyl and tri-$C_9$—$C_{11}$-alkyl trimellitate. Common abbreviations are TOTM (trioctyl trimellitate, tri-2-ethylhexyl trimellitate), TIDTM (triisodecyl trimellitate) and TITDTM (triisotridecyl trimellitate). Other examples include glutarates, malonates, oxalates, suberates, and glycolates.

C. Polymeric liazers. Common starting materials for preparing polyester plasticizers include dicarboxylic acids, such as adipic, phthalic, azelaic or sebacic acid; diols, such as 1,2-propanediol, 1,3-butanediol, 1,4-butanediol, 1,6-hexanediol, neopentyl glycol and diethylene glycol.

D. Citric Acid Ester Plasticizers. A definition of these and other plasticizers and examples of the same are given in "Kunststoffadditive" ["Plastics Additives"], R. Gachter/H. Muller, Carl Hanser Verlag, 3rd Ed., 1989, Chapter 5.9.6, pp. 412-415, and in "PVC Technology", W. V. Titow, 4th Ed., Elsevier Publ., 1984, pp. 165-170, each of which is herein incorporated by reference in its entirety.

E. Epoxy Compound Plasticizers. Exemplary materials include epoxidized polybutadiene and polyisoprene, if desired also in a partially hydroxylated form, or of glycidyl acrylate and glycidyl methacrylate as homo- or copolymer.

In one embodiment, the plasticized halogenated polymer compositions having incorporated therein the plasticizer compositions of the invention provide reduced plasticizer extraction when compared to otherwise identical plasticized halogenated polymers except for the presence of the plasticizer compositions of the invention.

In certain embodiments, the plasticizer compositions of the invention provide at least about 15% reduced plasticizer extraction from plasticized halogenated polymers, compared to otherwise identical plasticized halogenated polymers except for the presence of the plasticizer compositions of the invention. In one embodiment, the plasticizer compositions may provide reduced plasticizer extraction of at least about 20%, 30%, 40%, 50% compared to otherwise identical plasticized halogenated polymers except for the presence of the plasticizer compositions of the invention.

The plasticizer compositions of the invention may be added into halogenated polymers, such as PVC, in an amount effective for reduced extraction, lower volatility and detectable plasticizing effect for which the invention also provides respective methods. Preferably, the plasticizer compositions are added to halogenated polymers in the range of from about 1 to about 200 parts, based on 100 parts halogenated polymer. More preferable is a range from between about 10 to about 60 parts and from about 30 to about 60 parts, based on 100 parts halogenated polymer. These ranges represent examples of effective amounts. Other examples of effective amounts include: from about 2 to about 150 parts; about 5 to about 100 parts; about 10 to about 60 parts; about 20 to about 50 parts, based on 100 parts halogenated polymer.

The plasticizer compositions may give reduced volatility of at least 25% compared to otherwise identical plasticized halogenated polymers except for the presence of the plasticizer compositions of the invention. Furthermore, the inventive compositions may reduce volatility by at least 30, 40, 50% compared to otherwise identical plasticized halogenated polymers except for the presence of the plasticizer compositions of the invention In other embodiments, the plasticizer compositions of the invention may be incorporated into PVC articles, including flexible PVC.

The plasticizer compositions of the invention may also be incorporated into PVC in combination with PVC stabilizers. PVC stabilizes are known in the art (see for example Plastics Additives Handbook, 5$^{th}$ Edition, ed. Hans Zweifel, Hanser Publishers. Munich, 2001, pg. 27-483, which is incorporated by reference herein in its entirety). Exemplary PVC stabilizers include zinc intermediates, such as zinc salts, zinc acetylacetonate, liquid phosphite esters, and the like.

In some embodiments of the invention, the plasticizer compositions also include one or more additives to enhance or modify one or more chemical or physical properties, such as heat stability, lubricity, color, viscosity, to name a few. Exemplary additives include, but are not limited to, heat stabilizers, lubricants, viscosity control agents. UV absorbers, antioxidants, antistatic agents, antimicrobials and antifungal compounds, among other compounds conventionally used in flexible PVC formulations. An overview of these can be found in Plastics Additives Handbook, 4$^{th}$ edition, editors: R. Gächter and H. Müller, associate editor P. P. Klemchuk; Hanser Publishers, Munich, 1993 and Plastics Additives and Modifiers Handbook, ed. J. Edenbaum; Van Nostrand Reinhold, 1992, which is incorporated by reference herein in its entirety.

A single additive can serve multiple purposes. For example, a single additive can serve both as heat stabilizer and lubricant. Additives used in combination with the plasticizer compositions of the invention can be incorporated into halogenated polymers, including PVC, in any amount suitable to achieve the desired purpose.

In various embodiments of the invention, use may be made of one or more of the following additives and/or mixtures thereof with the plasticizer compositions of the present invention in halogen-containing polymers.

I. Polyols and Other Organic Components

Exemplary compounds of this type include sorbitol, triethanolamine, polyethylene glycols, β-diketones, such as dibenzoylmethane, uracils, and the like. Examples of the amounts of the polyols used are from 0.01 to 20 parts by weight, advantageously from 0.1 to 10 parts by weight and in particular from 0.1 to 6 parts by weight, based on 100 parts by weight of PVC.

II. Hydrotalcite Co-Stabilizers

The chemical composition of these compounds is known to one of ordinary skill in the art (see e.g., DE 3 843 581, U.S. Pat. No. 4,000,100, EP 0 062 813 and WO 93/20135, each of which is herein incorporated by reference in its entirety).

Compounds from the hydrotalcite series may be described by the following general formula

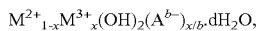

$$M^{2+}_{1-x}M^{3+}_{x}(OH)_2(A^{b-})_{x/b}\cdot dH_2O,$$

where
  $M^{2+}$=one or more of the metals selected from the group consisting of Mg, Ca, Sr, Zn and Sn,
  $M^{3+}$=Al or B,
  $A^n$ is an anion of valency n,
  b is a number from 1-2,
  0<x<0.5, and
  d is a number from 0-20.

Preference is given to compounds with $A^n$=OH$^-$, ClO$_4^-$, HCO$_3^-$, CH$_3$COO$^-$, C$_6$H$_5$COO$^-$, CO$_3^{2-}$, (CHOHCOO)$_2^{2-}$, (CH$_2$COO)$_2^{2-}$, CH$_3$CHOHCOO$^-$, HPO$_3^-$ or HPO$_4^{2-}$;

Examples of hydrotalcites include Al$_2$O$_3$.6MgO.CO$_2$.12H$_2$O, Mg$_4$.5Al$_2$(OH)$_{13}$.CO$_3$.3.5H$_2$O, 4MgO.Al$_2$O$_3$.CO$_2$.9H$_2$O, 4MgO.Al$_2$O$_3$.CO$_2$.6H$_2$O, ZnO.3MgO.Al$_2$O$_3$.CO$_2$.8-9H$_2$O and ZnO.3MgO.Al$_2$O$_3$.CO$_2$.5-6H$_2$O.

III. Metal Soap Stabilizers

Metal soaps are primarily metal carboxylates, preferably of relatively long-chain carboxylic acids. Well-known examples of these are stearates, oleates, palmitates, ricinolates, hydroxy tearates, dihydroxy-stearates and laurates.

Exemplary metals include alkali, alkaline earth and rare earth metals. Preferred are Na, K, Mg, Ca, Sr, Ba, Pb, Zn, Al, La, and Ce. Use is frequently made of so-called synergistic mixtures, such as barium/zinc stabilizers, magnesium/zinc stabilizers, calcium/zinc stabilizers or calcium/magnesium/zinc stabilizers. The metal soaps may be used either alone or in mixtures. An overview of common metal soaps is found in Ullmann's Encyclopedia of Industrial Chemistry, 5th Ed., Vol. A16 (1985), pp. 361 et seq, which is incorporated by reference herein in its entirety.

The metal soaps or mixtures of these may be used in amounts of, for example, 0.001 to 10 parts by weight, expediently 0.01 to 8 parts by weight, particularly preferably 0.05 to 5 parts by weight, based on 100 parts by weight of PVC.

IV. Alkali Metal and Alkaline Earth Metal Compounds

For the purposes of the present invention, examples of these materials include the carboxylates of the acids described above, but also corresponding oxides or, respectively, hydroxides or carbonates. Mixtures of these with organic acids are also possible. Examples include NaOH, KOH, CaO, Ca(OH)$_2$, MgO, Mg(OH)$_2$, BaO, Ba(OH)$_2$, Sr(OH)$_2$, Al(OH)$_2$, CaCO$_3$ and MgCO$_3$ (and also basic carbonates), and also selected salts of Na and of K, including perchlorates. In the case of alkaline earth carboxylates and Zn carboxylates it is also possible to use adducts of these as so-called "overbased" compounds. In addition to the stabilizers according to the invention it is preferable to use alkali alkaline earth metal carboxylates.

V. Organotin Stabilizers

Examples of possible compounds of this type include both mono- and dimethyl, butyl and octyitin mercaptides, maleates and the like.

VI. Phosphites (Triesters of Phosphorous Acid)

Organic phosphites are known co-stabilizers for chlorine-containing polymers. Examples of these are triphenyl phosphite, diphenyl isodecyl phosphite, ethylhexyl diphenyl phosphite, phenyl diisodecyl phosphite, trilauryl phosphite, triisononyl phosphite, triisodecyl phosphite, epoxy grade triphenyl phosphite, diphenyl phoshite, and tris(nonylphenyl) phosphite. Advantageous use may also be made of phosphites of various di- or polyols.

Examples of total amounts of the organic phosphites used, or of mixtures thereof, are from 0.01 to 10 parts by weight, advantageously from 0.05 to 5, and in particular from 0.1 to 3 parts by weight, based on 100 parts by weight of PVC.

VII. Lubricants

Examples of possible lubricants include fatty acids, fatty alcohols, montan wax, fatty acid esters, PE waxes, amide waxes, chloroparaffins, glycerol esters and alkaline earth metal soaps, and fatty ketones, and also the lubricants, or combinations of the lubricants, listed in EP0259783, which is herein incorporated by reference in its entirety. Stearic acid, stearic esters and calcium stearate are preferred.

VIII. Fillers

Fillers such as calcium carbonate, dolomite, wollastonite, magnesium oxide, magnesium hydroxide, silicates, china clay, talc, glass fibers, glass beads, wood flour, mica, metal oxides or metal hydroxides, carbon black, graphite, rock flour, heavy spar, glass fibres, talc, kaolin and chalk may be used in accordance with some embodiments of the present invention (see e.g., HANDBOOK OF PVC FORMULATING, E. J. Wickson, John Wiley & Sons, Inc., 1993, pp. 393-449; see also TASCHENBUCH der Kunststoffadditive [Plastics Additives Handbook], R. Gächter & H. Müller, Carl Hanser, 1990, pp. 549-615), each of which is herein incorporated by reference in its entirety.

The fillers may be used in amounts of preferably at least one part by weight, for example 1 to 20 parts by weight, expediently 1 to 10 parts by weight and in particular from 1 to 5 parts by weight, based on 100 parts by weight of PVC.

IX. Pigments

Suitable substances are known to those of ordinary skill in the art. Examples of inorganic pigments include $TiO_2$, pigments based on zirconium oxide, $BaSO_4$, and zinc oxide (zinc white). Mixtures of various pigments may also be used. A definition and further descriptions are found in the "Handbook of PVC Formulating", E. J. Wickson, John Wiley & Sons, New York, 1993, which is herein incorporated by reference in its entirety.

X. Antioxidants

Exemplary embodiments include alkylated monophenols, e.g., 2,6-di-tert-butyl-4-methylphenol, alkylthiomethylphenols, e.g., 2,4-dioctylthiomethyl-6-tert-butylphenol, alkylated hydroquinones, e.g., 2,6-di-tert-butyl-4-methoxyphenol, hydroxylated thiodiphenyl ethers, e.g., 2,7-thiobis(6-tert-butyl-4-methylphenol), alkylidenebisphenols, e.g., 2,2'-methylene-bis(6-tert-butyl-4-methylphenol), benzyl compounds, e.g., 3,5,3',5'-tetratert-butyl-4,4'-dihydroxy-dibenzyl ether, hydroxybenzylated malonates, e.g., dioctadecyl 2,2-bis(3,5-di-tert-butyl-2-hydroxybenzyl)malonate, hydroxybenzyl aromatics, e.g., 1,3,5-tris(3,5-di-tert-butyl-4-hydroxybenzyl)-2,4,6-trimethylbenzene, triazine compounds, e.g., 2,4-bisoctylmercapto-6-(3,5-di-tert-butyl-4-hydroxyanilino)-1,3,5-triazine, phosphonates and phosphonites, e.g., dimethyl 2,5-di-tert-butyl-4-hydroxybenzylphosphonate, acylaminophenols, e.g., 4-hydroxylauranilide, esters of β-(3,5-ditert-butyl-4-hydroxyphenyl)propionic acid, e.g., pentaerythritol tetrakis(3-(3,5-di-tert-butyl-4-hydroxyphenyl)propionate), octadecyl-3-(3,5-di-tert-butyl-4-hydroxyphenyl)propionate, β-(5-tertbutyl-4-hydroxy-3-methylphenyl)propionic acid, β-(3,5-dicyclohexyl-4-hydroxyphenyl)propionic acid, esters of 3,5-ditert-butyl-4-hydroxyphenylacetic acid with mono- or polyhydric alcohols, amides of β-(3,5-ditert-butyl-4-hydroxyphenyl) propionic acid, such as, for example, N,N'-bis(3,5-ditert-butyl-4-hydroxyphenyl-propionyl)hexamethylenediamine, vitamin E (tocopherol) and derivatives. Mixtures of antioxidants may also be used.

Examples of the amounts of the antioxidants used are from about 0.01 to about 10 parts by weight, advantageously from 0.1 to 5 parts by weight and in particular from 0.1 to 3 parts by weight, based on 100 parts by weight of PVC.

XI. UV Absorbers and Light Stabilizers

Examples of UV absorbers and light stabilizers include 2-(2'-hydroxyphenyl)benzotriazoles, such as 2-(2'-hydroxy-5'-methylphenyl)-benzotriazole, 2-hydroxybenzophenones, esters of unsubstituted or substituted benzoic acids, such as 4-tert-butylphenyl salicylate, phenyl salicylate, acrylates, nickel compounds, oxalamides, such as 4,4'-dioctyloxyoxanilide, 2,2'-dioctyloxy-5,5'-ditert-butyloxanilide, 2-(2-hydroxyphenyl)-1,3,5-triazines, such as 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, sterically hindered amines, such as bis(2,2,6,6-tetramethylpiperidin-4-yl) sebacate, bis(2,2,6,6-tetramethylpiperidin-4-yl) succinate and the like. Mixtures of the UV absorbers and/or light stabilizers may also be used.

As provided above, the plasticizer compositions of the present invention can be incorporated into one or more halogen-containing polymers in, for example, a blending or formulating step. Examples of halogen-containing polymers include polymers of vinyl chloride (PVC), of vinylidene chloride, vinyl resins whose structure contains vinyl chloride units, such as copolymers of vinyl chloride and alkylglycidyl acrylates, copolymers of vinyl chloride and vinyl esters of aliphatic acids, in particular vinyl acetate, copolymers of vinyl chloride with esters of acrylic or methacrylic acid and with acrylonitrile, copolymers of vinyl chloride with diene compounds and with unsaturated dicarboxylic acids or anhydrides of these, such as copolymers of vinyl chloride with diethyl maleate, diethyl fumarate or maleic anhydride, postchlorinated polymers and copolymers of vinyl chloride, copolymers of vinyl chloride and vinylidene chloride with unsaturated aldehydes, ketones and others, such as acrolein, crotonaldehyde, vinyl methyl ketone, vinyl methyl ether, vinyl isobutyl ether and the like; polymers of vinylidene chloride and copolymers of the same with vinyl chloride and with other polymerizable compounds; polymers of vinyl chloroacetate and of dichlorodivinyl ether; chlorinated polymers of vinyl acetate, chlorinated polymeric esters of acrylic acid and of α-substituted acrylic acid; polymers of chlorinated styrenes, such as dichlorostyrene; chlorinated rubbers; chlorinated polymers of ethylene; polymers and postchlorinated polymers of chlorobutadiene and copolymers of these with vinyl chloride, chlorinated natural or synthetic rubbers, and also mixtures of the polymers mentioned with themselves or with other polymerizable compounds. For the purposes of this invention, PVC includes copolymers with polymerizable compounds, such as acrylonitrile, vinyl acetate or ABS, where these may be suspension polymers, bulk polymers or else emulsion polymers.

Preference is given to a PVC homopolymer, postchlorinated PVC (C-PVC), also in combination with polyacrylates.

Other suitable polymers are graft polymers of PVC with EVA, ABS or MBS. Preferred substrates are mixtures of the abovementioned homo- and copolymers, in particular vinyl chloride homopolymers, with other thermoplastic or/and elastomeric polymers, in particular blends with ABS, MBS, NBR, SAN, EVA, CPE, MBAS, PMA, PMMA, EPDM or with polylactones, in particular from the group consisting of ABS, NBR, NAR, SAN and EVA. The abbreviations used for the copolymers are familiar to those skilled in the art and have the following meanings: ABS: acrylonitrile-butadiene-styrene; SAN: styrene-acrylonitrile; NBR: acrylonitrile-butadiene; NAR: acrylonitrile-acrylate; EVA; ethylene-vinyl acetate. Other possible polymers are in particular styrene-acrylonitrile copolymers based on acrylate (ASA).

The plasticizer compositions of the invention, in particular in the form of flexible PVC formulations, are used in, and suitable for, wire and cable jacketing and insulation, decorative sheeting, roofing membranes, agricultural and packaging film, hoses, tubing, floorcovering, shower curtains, carpet backing, interior and exterior trim, sealants and coatings, and automotive parts. Additional examples of the use of the plasticizer compositions according to the invention include plastisols, for example, plastisol for artificial leather, floorings, textile coatings, wall coverings, coil coatings, carpet backing, and floor mats for motor vehicles.

In some embodiments, conventional plasticizers can be used in combination with the plasticizer compositions of the invention or in combination with epoxidized fatty acid mono-ester plasticizers, which the invention also provides. The weight ratio of epoxidized fatty acid mono-esters to conventional plasticizers can be about 1:1, 1:2, 1:3, 1:5, 1:8, 1:10, 2:1, 3:1, 5:1 or 8:1. Preferred is a weight ratio in the range from about 1:5 to about 3:1. Representative conventional plasticizers that may be combined with the inventive epoxidized fatty acid mono-ester plasticizers are butylbenzyl phthalate, di-isononyl phthalate and dioctyl terephthalate.

In some embodiments still, the invention provides a method of reducing plasticizer extraction comprising adding an effective amount of the inventive plasticizer compositions to halogenated polymers, such as PVC.

In some embodiments, the invention provides a process for preparing a plasticizer composition for reduced plasticizer extraction from plasticized halogenated polymers comprising the steps of (i) providing an epoxidized fatty acid mono-ester, and (ii) blending said epoxidized fatty acid mono-ester with an epoxy-ester and, optionally, a metal perchlorate and/or antioxidant, for a predetermined amount of time at ambient temperature to attain a stable, homogeneous, liquid blend. In some such embodiments, a product made by said process is provided by the invention.

In other embodiments, the invention provides a process for making a plasticized halogenated polymer composition for reduced plasticizer extraction from plasticized halogenated polymers comprising the steps of (i) providing an epoxidized fatty acid mono-ester, (ii) blending said epoxidized fatty acid mono-ester with an epoxy-ester and, optionally, a metal perchlorate and/or antioxidant, for a predetermined amount of time at ambient temperature to attain a stable, homogeneous liquid blend, and (iii) adding said stable, homogeneous liquid blend to a halogenated polymer. Examples of suitable halogenated polymers include polyvinylchloride (PVC), which is preferred.

The invention also provides product(s) made by any of the processes disclosed herein.

In further embodiments, the invention provides plasticized PVC compositions made by a process comprising the steps of providing an epoxidized fatty acid mono-ester, blending said epoxidized fatty acid mono-ester with an epoxy-ester for a predetermined amount of time at ambient temperature to attain a stable, homogeneous, liquid blend, and adding said stable, homogeneous, liquid blend to PVC at a temperature in a range of from 0-300° C. Preferred is a temperature range from 10-300° C., 0-200° C., 10-200° C., 10-100° C., more preferred from 20-80° C., 30-60° C. Other examples of blending temperatures include 30, 40, 50, 60, 70, 80, 90, 100, 110, 120, 140, 150° C. Also included are these as minimum temperatures.

In certain embodiments, the inventive plasticizer compositions may provide lower cloud points than epoxidized fatty acid mono-esters and/or epoxy esters, i. e, the individual components. It is well understood in the art that cloud points may be indicative of the stability of a given liquid material, including the plasticizer compositions of the invention. Without being bound by specific theory, cloud points may represent the lowest temperature at which a liquid matter, such as the plasticizer compositions of the invention, remains free of haze, gelling and cloudiness. When compared to epoxy-esters, the inventive plasticizer compositions may provide reduced cloud points of at least about 10%. Other examples of cloud point reduction, as provided by the inventive plasticizer compositions, include at least about 15%, 20%, 30%; compared to the cloud points of epoxy-esters.

In certain embodiments, the invention provides compositions for improved electrical properties such as volume resistivity. In some such embodiments, the plasticizer compositions of the invention provide or impart such improved electrical properties. In some embodiments still, the inventive plasticized halogenated polymer compositions provide improved electrical properties. Electrical properties including volume resistivity may improve by at least 5-25% compared to otherwise identical plasticized halogenated compositions except for the inclusion of the plasticizer compositions of the invention.

The compositions improving the electrical properties such as volume resistivity that the invention provides may, optionally, include antioxidants. Suitable antioxidants that can be included for improved electrical properties are phenolic antioxidants like alkylated monophenols, di-, tri- and tetraphenols. Exemplary antioxidants further include phosphites and thioesters.

Also suitable are alkylated monophenols, e.g., 2,6-di-tert-butyl-4-methylphenol, alkylthiomethyiphenols, e.g., 2,4-dioctylthiomethyl-6-tert-butylphenol, alkylated hydroquinones, e.g., 2,6-di-tert-butyl-4-methoxyphenol, hydroxylated thiodiphenyl ethers, e.g., 2,2'-thiobis(6-tert-butyl-4-methylphenol), alkylidenebisphenols, e.g., 2,2'-methylene-bis(6-tert-butyl-4-methylphenol), benzyl compounds, e.g., 3,5,3', 5'etratert-butyl-4,4'-dihydroxydibenzyl ether, hydroxybenzylated malonates, e.g., dioctadecyl 2,2-bis(3,5-di-tent-butyl-2-hydroxybenzyl)malonate, hydroxybenzyl aromatics, e.g., 1,3,5-tris(3,5-di-tert-butyl-4-hydroxybenzyl)-2,4,6-trimethylbenzene, triazine compounds, e.g., 2,4-bisoctylmercapto-6-(3,5-di-tert-butyl-4-hydroxyanilino)-1, 3,5-triazine, e.g., acylaminophenols, e.g., 4-hydroxylauranilide, esters of β-(3,5-ditert-butyl-4-hydroxyphenyl)propionic acid, e.g., pentaerythritol tetrakis(3-(3,5-di-tert-butyl-4-hydroxyphenyl)propionate), octadecyl-3-(3, 5-di-tert-butyl-4-hydroxyphenyl)propionate, β-(5-tert-butyl-4-hydroxy-3-methylphenyl)propionic acid, β-(3,5-dicyclohexyl-4-hydroxyphenyl)propionic acid, esters of 3,5-ditert-butyl-4-hydroxyphenylacetic acid with mono- or polyhydric alcohols, amides of β-(3,5-ditert-butyl-4-hydroxyphenyl)propionic acid, such as, for example, N,N'-bis(3,5-ditert-butyl-4-hydroxyphenyl-propionyl)hexamethylenediamine, vitamin E (tocopherol) and derivatives.

Mixtures of at least antioxidants may also be used. Examples of the amounts of the antioxidants used are from about 0.01 to about 10 parts by weight, advantageously from about 0.1 to about 5 parts by weight and in particular from about 0.1 to about 3 parts by weight, based on 100 parts by weight of PVC. Of particular preference is a range from about 0.1 to about 1 parts, based on 100 parts by weight of PVC.

In order that the invention disclosed herein may be more fully understood, the following examples are provided. These examples are for illustrative purposes only and are not to be construed as limiting the invention in any manner. As in the remainder of the description, parts and percentages are given based on weight unless stated otherwise.

EXAMPLES

Materials:

The materials listed below were obtained from Galata Chemicals, LLC (Southbury, CT): Epoxidized 2-ethylhexyl tallate (designated EOT hereinbelow) as Drapex® 4.4; epoxidized 2-ethylhexyl soyate (ECS) as Drapex® 5.2; epoxidized soybean oil (ESBO) as Drapex® 6.8.

Butylbenzyl phthalate (BBP), dipropyiene glycol dibenzoate (DPGDB) and dioctyl terephthalate (DOTP) were purchased from Sigma-Aldrich.

The following compounds were obtained from Chemtura Corp. (Middlebury. Conn.): 2,2'-methylene-bis(6-t-butyl-4-methylphenol) as Lowinox 22M46; pentaerythritol tetrakis (3-(3,5-di-tert-butyl-4-hydroxyphenyl)propionate) as Anox 20; octadecyl-3-(3,5-di-tert-butyl-4-hydroxyphenyl)propionate as Anox PP18.

Abbreviations:

I.E.=Inventive Examples; PB=Plasticizer Blend.

Examples 1-3

Plasticizer blends were prepared by blending 75 g epoxidized 2-ethylhexyl tallate and 25 g epoxidized soybean oil (PB 1): 62.5 g epoxidized 2-ethylhexyl tallate and 32.5 g epoxidized soybean oil (PB 2); 50 g epoxidized 2-ethylhexyl tallate and 50 g epoxidized soybean oil (PB 3). The samples were mixed for 1 hour at ambient temperature to attain a stable, homogeneous liquid blend.

Example 4

Cloud Point Test

Samples prepared in Examples 1-3 as well as the ESBO and EOT controls were cooled in order to determine the lowest temperature point at which the samples remain free of haze, gelling and cloudiness. As can be seen in Table 1, Cloud Points of the plasticizer compositions of the invention, PB 1-PB 3, are surprisingly lower (41° F.) than the Cloud Point for the controls, i.e., the individual blend components ESBO and EOT, at 49° F. and 69° F., respectively. This represents a 16% reduction in cloud point vs. EOT control (see Table 1).

TABLE 1

Cloud Points of Plasticizer Compositions/Blends and their Components

| Plasticizer | Amount of ESBO in the inventive plasticizer blend (wt. %) | Cloud Point (° F.) | Cloud Point Reduction (Temp.$_{EOT}$ − Temp.$_{PBX}$) | Cloud Point Reduction (%)$^\&$ |
|---|---|---|---|---|
| ESBO (control) | NA | 69 | — | — |
| EOT (control) | NA | 49 | — | — |
| PB 1 | 25.0 | 41 | 8 | 16 |
| PB 2 | 37.5 | 41 | 8 | 16 |
| PB 3 | 50.0 | 41 | 8 | 16 |

$^\&$(Temp.$_{EOT}$ − Temp.$_{PBX}$)/Temp.$_{EOT}$ *100

Flexible Polyvinyl Chloride (PVC) Sample Preparation

The tested formulations included the following: PVC resin Oxy-450 added at 100 phr; plasticizers: the blends according to Examples 1-3 and the following controls: di-isononyl phthalate (DINP), ESBO and EOT; Ba/Zn stabilizer Mark® 4781A (marketed by Galata Chemicals LLC) and stearic acid lubricant were added to all formulations at 2.5 and 0.2 phr, respectively (cf. Table 2).

The foregoing quantities are expressed in "phr", which stands for parts per 100 parts of PVC resin and indicates how many parts by weight of the particular substance are present in the PVC formulation based on 100 parts by weight PVC.

TABLE 2

Tested Formulations

| Components | Comparative A | Comparative B* | Comparative C | Comparative D | I.E. 1 | I.E. 2 | I.E. 3 |
|---|---|---|---|---|---|---|---|
| PVC resin | 100 | 100 | 100 | 100 | 100 | 100 | 100 |
| Ba/Zn stabilizer | 2.5 | 2.5 | 2.5 | 2.5 | 2.5 | 2.5 | 2.5 |
| Stearic Acid | 0.2 | 0.2 | 0.2 | 0.2 | 0.2 | 0.2 | 0.2 |
| DINP | 40 | | | | | | |
| DINP/ESBO | | 37/3 | | | | | |
| EOT | | | 40 | | | | |
| ESBO | | | | 40 | | | |
| PB 1 | | | | | 40 | | |
| PB 2 | | | | | | 40 | |
| PB 3 | | | | | | | 40 |

*Comparative B, a 37/3 (wt./wt.) blend of DINP/ESBO, represents a typical plasticizer composition wherein ESBO is used as the minor component For the conversion of the powder form of the PVC formulations into a usable form, a sheet was prepared under standardized conditions using a two-roll mill (Dr. Collin GmbH, Ebersberg, Germany). The gap between the rolls was about 0.5 mm; temperature of the rolls 165° C.; time for preparation and homogenization: 5 minutes; sheet thickness 0.5 mm. The PVC sheet was continuously moved from the two sides to the center and the enlargement thus obtained was distributed over the gap with a wooden spatula over the roll with intensive homogenization of all components.

Similar formulations were prepared for the plasticizer blends containing phthalate esters SBP, DPGDB and DOTP.

Testing of Plasticized Polyvinyl Chloride (PVC)

Example 5

Shore A Hardness

Shore A hardness of the formulations was determined in accordance with ASTM D2240, using a commercially available Durometer Type A hardness tester (Shore Instrument & Mfg Co, Jamaica, N.Y., USA). The tested samples were prepared in accordance with the sample preparation technique described above. The results of the Shore A hardness characterization were measured in triplicate; Table 3 contains an average of the three readings. A lower number indicates softer material. Softer materials are desirable.

TABLE 3

Shore A Hardness of PVC Formulations

| Formulation | Plasticizer Amount (phr) | Shore A |
| --- | --- | --- |
| Comparative A | 40 | 91 |
| Comparative B | 37/3 | 91 |
| Comparative C | 40 | 92 |
| Comparative D | 40 | 92 |
| I.E. 2 | 40 | 87 |
| I.E. 3 | 40 | 88 |

The data demonstrate that Shore A Hardness values of the PVC formulations containing the plasticizer compositions of the invention give softer PVC (Shore A Hardness of 87 and 88, respectively, at equal plasticizer loading levels) than PVC containing the phthalate controls (Shore A Hardness of 91), and PVC containing the individual blend components (Shore A hardness of 92).

Example 6

Volatility of Plasticizer Blends Incorporated Into Flexible PVC Formulations

Volatility of the plasticizer blends incorporated into the flexible PVC milled sheets (thickness of 0.5 mm) was calculated in percent weight loss upon exposing the prepared PVC mill sheet chips (25×25 mm) to 135° C. temperature over 24 hour period of time. Weights were recorded using an analytical balance. The results were measured in triplicates. Table 4 shows an average of the three readings.

TABLE 4

Volatility of flexible PVC formulations

| Formulation | Plasticizer Amount, phr | Volatility, % | Volatility reduction over Comparative B, % |
| --- | --- | --- | --- |
| Comparative B | 37/3 | 3.9 | NA |
| I.E. 1 | 40 | 0.8 | 79 |
| I.E. 2 | 40 | 2.1 | 46 |
| I.E. 3 | 40 | 2.3 | 41 |
| Epoxidized methyl soyate* (comparative sample) | 40 | 9.7 | Volatility increases by 149% (no reduction) |

*Cf. WO2011/143028 but without elastomeric compatibilizers

The results in Table 4 demonstrate that the inventive PVC formulations (I.E. 1-3) are significantly less volatile (by 41-79%) than a control formulation, Comparative B. The results in Table 4 further show that a significant reduction in volatility is unexpectedly achieved in the absence of any compatibilizers (including those described in WO2011/143028).

Example 7

Extraction of Plasticizers from Flexible PVC Formulations

Extraction of the plasticizers from the flexible PVC milled sheets (thickness of 0.5 mm) was measured by submersing weighted samples of known surface area in a) sunflower oil at ambient temperature for 14 days, and b) hexane at ambient temperature for 24 hours. Weight loss associated with extraction of the plasticizers was calculated in mg/dm$^2$ upon removal of the samples from the oil, wiping off any excess oil, rinsing the samples with isopropanol to completely remove the oil from the surface and air drying the samples. Weights were recorded using an analytical balance. The results were measured in triplicates. Tables 5-7 contain an average of the three readings.

TABLE 5

Extraction of plasticized PVC formulations

| Formulation | Plasticizer Amount, phr | Extraction in sunflower oil, mg/dm$^2$ | Extraction in hexane, mg/dm$^2$ |
| --- | --- | --- | --- |
| Comparative B | 37/3 | 320 | 600 |
| I.E. 2 | 40 | 200 | 200 |

Table 5 shows extraction results for flexible PVC formulations containing both the plasticizer blend of the invention and the DINP/ESBO control. The plasticizer blends of the invention (I. E. 2) when incorporated into the PVC give lower extraction than the control Comparative B.

Tables 6-7 demonstrate that the plasticizer blends of the invention gave lower extraction values for extraction out of a PVC matrix compared to the calculated extraction values for the individual components of the blends. The calculated extraction values are based on extraction of the individual control components and their concentrations in the blends.

The plasticizer compositions of the invention reduce extraction in the range of from 33 to 52%, with epoxy-ester amounts ranging from 25% to 37.5 wt. % based on total plasticizer weight (Table 6). For epoxidized fatty acid monoester plasticizer compositions, reduction of extraction was from 29 to 57%, with phthalate esters being added at 25 wt. % based on total plasticizer weight (Table 7).

TABLE 6

Reduction of extraction of the plasticizer compositions

| Formulation | Amount of ESBO in the blend, wt. % | Extraction of Controls, mg/dm$^2$ | Calculated Extraction based on additivity (linearity) of the Controls, mg/dm$^2$ | Actual Extraction, mg/dm$^2$ | Reduction of extraction over expected extraction (%) |
|---|---|---|---|---|---|
| Comparative C | NA | 600 | NA | NA | NA |
| Comparative D | NA | 120 | NA | NA | NA |
| I.E. 1 | 25.0 | NA | 480 | 320 | 33 |
| I.E. 2 | 37.5 | NA | 420 | 200 | 52 |

Plasticizer compositions comprising epoxidized fatty acid mono-esters and conventional plasticizers:

TABLE 7

Reduction of extraction of epoxidized fatty acid mono-ester plasticizer compositions (containing phthalate esters at 25 wt. % based on total plasticizer weight)

| Plasticizer | Amount in PVC formulation, phr | Actual Extraction, mg/dm$^2$ | Calculated Extraction based on additivity (linearity) of the Controls, mg/dm$^2$ | Reduction of actual extraction versus calculated extraction (%) |
|---|---|---|---|---|
| EOT (Comparative E) | 40 | 600 | NA | NA |
| DPGDB (Comparative F) | 40 | 40 | NA | NA |
| EOT/DPGDB (I.E. 4) | 30/10 | 200 | 460 | 57 |
| BBP (Comparative G) | 40 | 40 | NA | NA |
| EOT/BBP (I.E. 5) | 30/10 | 240 | 460 | 48 |
| DOTP (Comparative H) | 40 | 240 | NA | NA |
| EOT/DOTP (I.E. 6) | 30/10 | 360 | 510 | 29 |

The results demonstrate a significant, unexpected reduction in actual extraction versus calculated extraction (in percent) for inventive examples I.E 4-6 vs. Controls. Thus, up to 57% reduction of actual extraction vs. calculated extraction is achieved in I.E. 4.

Example 8

Volatility and Haze Testing

TABLE 8

Improved Volatility and Haze Characteristics of the Plasticizer Compositions

| Plasticizer compositions | Plasticizer loading, phr | Extraction in sunflower oil, mg/dm$^2$ | Volatility, % | Haze, % (in accordance with ASTM D 1003) |
|---|---|---|---|---|
| DINP/ESBO (Comparative I) | 37/3 | 141 | 3.9 | 1.42 |

TABLE 8-continued

Improved Volatility and Haze Characteristics of the Plasticizer Compositions

| Plasticizer compositions | Plasticizer loading, phr | Extraction in sunflower oil, mg/dm$^2$ | Volatility, % | Haze, % (in accordance with ASTM D 1003) |
|---|---|---|---|---|
| EOS (Comparative J) | 40 | 315 | 1.4 | 1.25 |
| ESBO (Comparative K) | 40 | 212 | 0.8 | 1.60 |
| EOS/ESBO (I.E. 8) | 30/10 | 234 | 1.3 | 1.08 |
| EOS/ESBO (I.E. 9) | 20/20 | 140 | 0.7 | 1.14 |
| EOS/ESBO (I.E. 10) | 10/30 | 109 | | 1.88 |

The results demonstrate synergism for volatility and haze characteristics of the plasticizer compositions of the invention, inventive examples I.E. 8-10, when compared to controls made up from the individual blend components (Comparative J, K) and a control containing a conventional plasticizer (Comparative I). As can be seen, inventive example I.E. 9 gives less volatility and haze than Comparative J and K.

Example 9

Electrical Properties: Measurement of Volume Resistivity

All antioxidants (AO1-3) were dissolved in the plasticizer composition blends according to Table 9 by mixing the components at ambient temperature for 1 hour.

TABLE 9

Improved Volume Resistivity for Plasticizer Compositions Containing Antioxidants

| Plasticizer | Plasticizer composition (loaded at 40 phr) | Antioxidant | Amount of Antioxidant pre-dissolved in 40 phr plasticizer (phr) | Volume Resistivity of PVG compounds plasticized by plasticizer blends ($\Omega \cdot m$) |
|---|---|---|---|---|
| DINP/ESBO (Comparative L) | 37/3 | None | N/A | 3.8E+13 |
| EOT (Comparative M) | 40 | None | N/A | 5.5E+12 |
| EOT/ESBO | 25/15 | None | N/A | 9.2E+12 |

TABLE 9-continued

Improved Volume Resistivity for Plasticizer Compositions Containing Antioxidants

| Plasticizer | Plasticizer composition (loaded at 40 phr) | Antioxidant | Amount of Antioxidant pre-dissolved in 40 phr plasticizer (phr) | Volume Resistivity of PVG compounds plasticized by plasticizer blends ($\Omega \cdot m$) |
|---|---|---|---|---|
| EOT/ESBO (I.E. 11) | 25/15 | AO1 | 0.4 | 9.8E+12 |
| EOT/ESBO (I.E. 12) | 25/15 | AO2 | 0.2 | 1.0E+13 |
| EOT/ESBO (I.E. 13) | 25/15 | AO2 | 0.3 | 1.6E+13 |
| EOT/ESBO (I.E. 14) | 25/15 | AO3 | 0.5 | 1.1E+13 |

AO1: 2,2'-Methylene-bis(6-t-butyl-4-methylphenol)
AO2: pentaerythritol tetrakis(3-(3,5-di-tert-butyl-4-hydroxyphenyl)propionate)
AO3: octadecyl-3-(3,5-di-tert-butyl-4-hydroxyphenyl)propionate The results for volume (i.e., electrical) resistivity in Table 9 demonstrate a significant and unexpected improvement for inventive Examples I.E. 11-14 when compared to controls (Comparative L-M). As can be further seen, I.E.11-14 of the invention, made up of plasticizers and antioxidants, g-ve much higher electrical/volume resistivity (as measured in Ohm meters) than an otherwise identical material except for the presence of antioxidant (EOT/ESBO).

Example 10

Yellowness Index Reduction with Metal Perchlorate

All PVC compounds were plasticized by adding the inventive plasticizer compositions/blends at 40 phr to PVC. Sodium perchlorate ($NaClO_4$), obtained as Mark CE-350 from Galata Chemicals LLC, was added to the inventive plasticizer blends at 0.8 wt. percent.

TABLE 10

Perchlorate based Reduction of Yellowness as measure by Static Heat Stability Test at 190° C.

| | Yellowness index | | | |
|---|---|---|---|---|
| Exposure time (min.) | Comparative N EOT/ESBO 60/40* | I.E. 15 EOS/ESBO 60/40 with $NaClO_4$* | Comparative O EOS/ESBO 50/50* | I.E. 16 EOS/ESBO 50/50 with $NaClO_4$* |
| 0 | 17.99 | 17.78 | 12.61 | 12.2 |
| 10 | 19.28 | 18.12 | 14.64 | 13.82 |
| 20 | 22.31 | 19.72 | 19.25 | 17.97 |
| 30 | 27.11 | 21.04 | 21.93 | 22.45 |
| 40 | 37.83 | 22.73 | 40.52 | 21.48 |
| 50 | 48.53 | 27.49 | 46.33 | 21.85 |
| 60 | 55.08 | 31.41 | 42.15 | 22.05 |
| 70 | 66.26 | 34.69 | 35.5 | 29.75 |

*at 40 phr

The results in Table 10 demonstrate that inventive examples I.E. 15 and 16 significantly and unexpectedly reduce Yellowness Index, as measured over time during exposure at 190° C., when compared to otherwise identical controls except for the presence of $NaClO_4$ (Comparative N, O).

What is claimed is:

1. A plasticizer composition comprising:
   i. an epoxidized fatty acid mono-ester selected from epoxidized 2-ethylhexyl tallate, epoxidized 2-ethylhexyl soyate, epoxidized octyl tallate, epoxidized octyl soyate, epoxidezed octyl oleate, epoxidized methyl soyate or mixtures thereof;
   ii. an epoxy-ester selected from epoxidized soybean oil, epoxidized linseed oil and mixtures thereof,
      the epoxidized fatty acid mono-ester and epoxy-ester being substantially free of mono- and/or diglycerides, and
      wherein the epoxy esters and epoxidized fatty acid mono esters are present in amounts such that a weight ratio of epoxy esters/epoxidized fatty acid mono esters ranges from 1/1.67 to 1/3; and
   iii. a metal perchlorate.

2. The plasticizer composition of claim 1, wherein the metal perchlorate is sodium or potassium perchlorate.

3. A plasticizer composition comprising:
   i. an epoxidized fatty acid mono-ester selected from epoxidized 2-ethylhexyl tallate, epoxidized 2-ethylhexyl soyate, epoxidized octyl tallate, epoxidized octyl soyate, epoxidized octyl oleate, epoxidized methyl soyate or mixtures thereof;
   ii. an epoxy-ester selected from epoxidized soybean oil, epoxidized linseed oil and mixtures thereof;
      the epoxidized fatty acid mono-esters and epoxy-esters being substantially free of mono- and/or diglycerides, and
      wherein the epoxy esters and epoxidized fatty acid mono esters are present in amounts such that a weight ratio of epoxy esters/epoxidized fatty acid mono esters ranges from 1/3 to 3/1;
   iii. a metal perchlorate; and
   iv. a conventional plasticizer selected from phthalates, hydrogenated phthalates, aliphatic esters of dicarboxylic acids, polymeric esters of dicarboxylic acids, citrates, sucrose esters, levulinic ketal esters, phosphates, alkyl phenol sulfonates, pyrrolidones, or mixtures thereof, wherein the weight ratio of epoxidized fatty acid mono-ester to conventional plasticizer is from 1:5 to 3:1.

4. The plasticizer composition of claim 1 further comprising an antioxidant.

5. The plasticizer composition of claim 4, wherein the antioxidant is pentaerythritol tetrakis (3-(3,5-di-tert-butyl-4-hydroxyphenyl)propionate), octadecyl-3-(3,5-di -tert-butyl-4-hydroxyphenyl)propionate or 2,2'-methylene-bis(6-t-butyl-4-methylphenol).

6. The plasticizer composition of claim 2, wherein the metal perchlorate is sodium perchlorate.

7. A plasticizer composition comprising:
   i. an epoxidized fatty acid mono-ester wherein the epoxidized fatty acid mono-ester is epoxidized 2-ethylhexyl tallate;
   ii. an epoxy-ester, wherein the epoxy ester is epoxidized soybean oil, the epoxidized fatty acid mono-ester and epoxy-ester being substantially free of mono- and/or diglycerides, and wherein the epoxy ester and epoxidized fatty acid mono ester are present in amounts such that a weight ratio of epoxy ester/epoxidized fatty acid mono ester ranges from 1/3 to 3/1; and iii. a metal perchlorate.

8. A plasticizer composition comprising:

i. an epoxidized fatty acid mono-ester, wherein the epoxidized fatty acid mono-ester is epoxidized 2-ethylhexyl soyate;

ii. an epoxy-ester, wherein the epoxy ester is epoxidized soybean oil, the epoxidized fatty acid mono-ester and epoxy-ester being substantially free of mono- and/or diglycerides, and wherein the epoxy ester and epoxidized fatty acid mono-ester are present in amounts such that a weight ratio of epoxy ester/epoxidized fatty acid mono ester ranges from 1/3 to 3/1; and iii. a metal perchlorate.

9. The plasticizer composition of claim 5 wherein the antioxidant is pentaerythritol tetrakis(3-(3,5-di-tert-butyl-4-hydroxyphenyl)propionate.

10. The plasticizer composition of claim 5 wherein the antioxidant is octadecyl-3-(3,5-di-tert-butyl-4-hydroxyphenyl)propionate.

11. The plasticizer composition of claim 5 wherein the antioxidant is 2,2'-methylene-bis(6-t-butyl-4-methylphenol).

12. A plasticized halogenated polymer composition comprising a halogenated polymer and the plasticizer composition according to claims 1, 3, 7 or 8.

13. The composition of claim 12, wherein the halogenated polymer is PVC.

14. A PVC article comprising the plasticizer composition according to claims 1, 3, 7 or 8.

15. The PVC article of claim 14 further comprising flexible PVC.

16. The PVC article of claim 15, wherein the flexible PVC is used in wire and cable jacketing and insulation, decorative sheeting, roofing membranes, agricultural and packaging films, hoses, tubing, floorcovering, shower curtains, carpet backing, interior and exterior trim, sealants and coatings, automotive parts, and artificial leather.

* * * * *